United States Patent [19]

Miyamoto et al.

[11] Patent Number: 4,689,392
[45] Date of Patent: Aug. 25, 1987

[54] HIGHLY REACTIVE AROMATIC HYDROCARBON-FORMALDEHYDE RESIN AND PROCESS FOR PREPARING THE SAME

[75] Inventors: Akira Miyamoto, Hiratsuka; Toshiaki Nishimura, Kanagawa; Yoshitaka Yamagishi, Hiratsuka; Yasumitsu Higuchi, Kanagawa, all of Japan

[73] Assignee: Mitsubishi Gas Chemical Company, Inc., Tokyo, Japan

[21] Appl. No.: 844,437

[22] Filed: Mar. 26, 1986

[30] Foreign Application Priority Data

Apr. 1, 1985 [JP] Japan ................................ 60-68781
Apr. 11, 1985 [JP] Japan ................................ 60-77238
Apr. 18, 1985 [JP] Japan ................................ 60-83539

[51] Int. Cl.[4] .................... C08G 10/02; C08G 16/02
[52] U.S. Cl. .................................. 528/247; 525/398; 525/400; 528/232
[58] Field of Search .................. 528/232, 242, 247; 525/398, 400

[56] References Cited

U.S. PATENT DOCUMENTS 3,407,178 10/1968 Heinrich ............................ 528/247
4,082,728 4/1978 Aziz et al. ......................... 528/247
4,410,690 10/1983 Miyamoto et al. ................ 528/247

OTHER PUBLICATIONS

Polymer Chemistry (Japan): vol. 12, No. 124, 14–22 (1955).
Die Makromolekulare Chemie XLIII, 189–219 (1961).
Angew Chem. 60, No. 4, 88–96 (1948).
British Plastics, Sep., issue, 564–567 (1965).

*Primary Examiner*—Lucille M. Phynes
*Attorney, Agent, or Firm*—Armstrong, Nikaido, Marmelstein & Kubovcik

[57] ABSTRACT

A highly reactive aromatic hydrocarbon-formaldehyde resin having a diarlymethane content of not more than 5% by weight, essentially containing reactive groups of any one of $CH_2OH$, $CH_2OCH_3$ and $CH_2OCH_2OCH_3$ at both molecular terminals and having a xylenol value of at least 15 mol/kg as an index of reactivity with a compound having active hydrogen atoms is prepared by reacting an aromatic hydrocarbon such as xylene, mesitylene or naphthalene with formaldehyde at a molar ratio of the formaldehyde to the aromatic hydrocarbon of 2.0 to 5.0, a sulfuric acid concentration of 15 to 35% by weight in an aqueous layer and a reaction temperature of 80° to 110° C. while controlling a formaldehyde conversion within a range of 50 to 70% by mole over the range 4 to 8 hours. By reaction of the aromatic hydrocarbon-formaldehyde resin with the compound having reactive hydrogen atoms such as phenols and carboxylic acids, a modified aromatic hydrocarbon resin capable of giving a cured resin having a high mechanical strength and a high heat resistance can be obtained.

12 Claims, No Drawings

HIGHLY REACTIVE AROMATIC HYDROCARBON-FORMALDEHYDE RESIN AND PROCESS FOR PREPARING THE SAME

BACKGROUND OF THE INVENTION

This invention relates to an aromatic hydrocarbon-formaldehyde resin, particularly a highly reactive aromatic hydrocarbon-formaldehyde resin with a higher content of reactive groups that are very reactive with compounds having active hydrogen atoms such as phenols, aliphatic saturated or unsaturated carboxylic acids, aromatic carboxylic acids, amines, etc., but with a very low content of diarylmethane components that are inactive in the reaction with the said compounds having the active hydrogen atoms, and also to a process for preparing the resin.

It is well known that the aromatic hydrocarbon-formaldehyde resin can be obtained by reaction of aromatic hydrocarbon with formaldehyde in the presence of an acid catalyst such as sulfuric acid. Generally, the aromatic hydrocarbon-formaldehyde resin is a mixture of many molecular species of oligomers and is composed of oligomers having 1 to 8 aromatic nuclei having one or more methylene bonds ($-CH_2-$), dimethyleneether bonds ($-CH_2-O-CH_2-$), and acetal bonds ($-(CH_2O)_n-CH_2-$) between the aromatic nuclei and with or without a methylol group ($-CH_2OH$), a methoxymethyl group ($-CH_2OCH_3$), or the like at the molecular terminal. It is also known that various modified aromatic hydrocarbon resins, for example, phenol-modified aromatic hydrocarbon resins, unsaturated carboxylic acid-modified aromatic hydrocarbon resins, anilin-modified aromatic hydrocarbon resins, etc. can be obtained by reaction of the aromatic hydrocarbon-formaldehyde resin with a compound having active hydrogen atoms such as phenols, aliphatic saturated or unsaturated carboxylic acids, aromatic carboxylic acids or amines in the presence of a catalyst, and these modified aromatic hydrocarbon resins have been utilized in various fields by virtue of their characteristics.

It is also known that oxygen-containing bonds or molecular terminal groups such as $CH_2OCH_2$ bond, $[(CH_2O)_n CH_2]$ bond, $CH_2OH$ group, $CH_2OCH_3$ group, etc. in the aromatic hydrocarbon-formaldehyde resin take part in the reaction of the aromatic hydrocarbon-formaldehyde resin with the compound having the active hydrogen atoms. [Angew. Chem. 60, No. 4, 88–96 (1948); Die Makromolekulore Chemie, XLIII, 189–219 (1961); British Plastics, September issue, 564–567 (1965)].

The following procedure for determining the content of the reactive groups in the aromatic hydrocarbon-formaldehyde resin is usually used, for example, in case of reaction with phenol. After reaction of the aromatic hydrocarbon-formaldehyde resin with phenol, the amount of the unreacted phenol in the reaction product is measured, and the maximum amount of phenol capable of reacting with the aromatic hydrocarbon-formaldehyde resin is calculated backward therefrom as a phenol number. However, phenol has 3 reactive points in the molecule, and thus one mole of the reactive groups in the aromatic hydrocarbon-formaldehyde resin sometimes fails to correspond to one mole of phenol, that is, the content of the reactive groups in the aromatic hydrocarbon-formaldehyde resin cannot be exactly given thereby.

The present inventors have studied a procedure for determining the content of the reactive groups in the aromatic hydrocarbon-formaldehyde resin and have found "a xylenol value" as an index for the degree of reactivity of the aromatic hydrocarbon-formaldehyde resin. It has been found that the xylenol value can appropriately show the reactivity of the aromatic hydrocarbon-formaldehyde resin. The xylenol value is a value expressed in moles of 2,6-xylenol that has reacted with 1 kg of the aromatic hydrocarbon-formaldehyde resin when the aromatic hydrocarbon-formaldehyde resin is made to react with 2,6-xylenol, and calculated according to the formula given later. The higher the xylenol value, the more reactive the resin.

On the other hand, the aromatic hydrocarbon-formaldehyde resin contains components whose constituent aromatic neclei are bonded through a methylene bond, that is, oligomer components composed of diarylmethane (e.g. 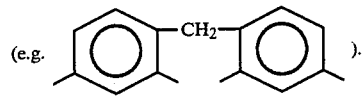 ).

The diarylmethane members fail to react with such compounds having the active hydrogen atoms, and remain as unreacted members in the modified resin, acting as a factor to lower the physical properties of the cured resin obtained from the modified resin. Thus, it is preferable that the content of the diarylmethane members are as small as possible in the resin.

Commercially available xylene formaldehyde resins, typical of the aromatic hydrocarbon formaldehyde resin, have number average molecular weights of 450 to 600 and containing 4 to 5 aromatic nuclei on the average and the xylenol value is 9.5 to 10.5 moles/kg.

The number of $-CH_2OH$, $-CH_2OCH_3$ and $-CH_2OCH_2OCH_3$ on the molecule, determined by 'H-NMR' is only 1. This means that the reactive groups such as methylol groups, methoxymethyl groups, etc. are only at one molecular terminal aromatic nucleus. The said resins contain 10 to 15% by weight of the compounds whose aromatic nuclei are bonded to one another through a methylene bond and which has no substituents at the molecular terminals, i.e. diarylmethane. Such xylene-formaldehyde resins are less reactive with the such compounds having the active hydrogen atoms, and cured resins obtainable from modified xylene resins prepared by reaction with phenols, aliphatic unsaturated carboxylic acids, aromatic carboxylic acids, amines, etc. have poor physical properties such as poor mechanical strength, heat resistance, etc.

SUMMARY OF THE INVENTION

An object of the present invention is to provide an aromatic hydrocarbon-formaldehyde resin which is highly reactive with compounds having active hydrogen atoms such as phenols, aliphatic saturated or unsaturated carboxylic acids, aromatic carboxylic acids, amines, etc.

Another object of the present invention is to provide a process for preparing a highly reactive aromatic hydrocarbon-formaldehyde resin.

Another object of the present invention is to provide a modified aromatic hydrocarbon resin capable of giving a cured resin having a high mechanical strength and a high heat resistance.

As a result of extensive studies, the present inventors have found it essential that the aromatic hydrocarbon-formaldehyde resin has a content of diarylmethane as low as possible, i.e. not more than 5% by weight on the basis of the resin, and a high xylenol value, i.e. at least 15 moles/kg, and also has reactive groups such as $CH_2OH$ groups, $CH_2OCH_3$ groups at both molecular terminals, so that a modified aromatic hydrocarbon resin obtained by reaction of the aromatic hydrocarbon-formaldehyde resin with compounds having active hydrogen atoms, and reactive with the aromatic hydrocarbon-formaldehyde resin such as phenols, aliphatic unsaturated carboxylic acids, aromatic carboxylic acids, amines, etc. can give a cured resin having a high mechanical strength and a high heat resistance. However, such a highly reactive aromatic hydrocarbon-formaldehyde resin has not been available yet.

An expectable process for preparing such a highly reactive aromatic hydrocarbon-formaldehyde resin would be a process based on, for example, lowering of the acid catalyst concentration e.g. sulfuric acid concentration or lowering of the reaction temperature in the reaction of an aromatic hydrocarbon with formaldehyde. However, aromatic hydrocarbon-formaldehyde resins obtained according to the said process have a higher content of diarylmethane and a lower content of the reactive group at the molecular terminals in the resins, and the desired highly reactive aromatic hydrocarbon-formaldehyde resins cannot be obtained.

As a result of further studies on how to obtain aromatic hydrocarbon-formaldehyde resins which are highly reactive with compounds having active hydrogen atoms such as phenols, aliphatic carboxylic acids, aromatic carboxylic acids, amines, etc. and have a content of diarylmethane as low as possible, the present inventors have found that the desired highly reactive aromatic hydrocarbon-formaldehyde resins having a low content of diarylmethane can be obtained by conducting the reaction of an aromatic hydrocarbon with formaldehyde while controlling a formaldehyde conversion within a range of 50 to 70% by mole at a molar ratio of the formaldehyde to the aromatic hydrocarbon of 2.0 to 5.0, a sulfuric acid concentration of 15 to 35% by weight and a reaction temperature of 80° to 110° C. for 4 to 8 hours.

The aromatic hydrocarbon-formaldehyde resins obtained according to the present process as described above have a xylenol value of at least 15 moles/kg, and many reactive groups, and also essentially have reactive groups such as $CH_2OH$ groups, $CH_2OCH_3$ groups, $CH_2OCH_2OCH_3$ groups, etc. at both molecular terminals and a content of diarylmethane of not more than 5% by weight in the resins.

The present aromatic hydrocarbon-formaldehyde resins thus obtained are highly reactive with such compounds having the active hydrogen atoms, and modified aromatic hydrocarbon resins obtained by reaction of the said resins with such compounds having the active hydrogen atoms can give cured resins having a high mechanical strength and a high heat resistance, as compared with the conventional aromatic hydrocarbon-formaldehyde resins.

In the present invention, it is very important to control the formaldehyde conversion within a range of 50 to 70% by mole and attain the conversion over the range 4 to 8 hours as described above. According to one of preferable procedures for attaining the said condition, the reaction must be carried out while maintaining an interface between an aqueous layer and an oil layer (resin layer). A means for attaining such reaction is to make the stirring speed thoroughly lower than the conventional one. It is difficult to set the stirring speed to a specific range, because it greatly depends on the size of a reactor, the shape of a stirrer, etc. For example, in case of a laboratory-scale reactor (capacity: about 2–5l) with an anchor-type stirrer, the stirring speed is about 150 to about 260 rpm. With a larger reactor capacity, the stirring speed will be lower, but not proportional to the reactor capacity, as will be shown in Examples which follow. In other words, the stirring speed must be appropriately selected so that the formaldehyde conversion can be controlled within a range of 50 to 70% by mole over the range 4 to 8 hours.

It is not preferable that the said formaldehyde reactivity is attained for a shorter time than 4 hours, because the content of diarylmethane is increased in the formed aromatic hydrocarbon-formaldehyde resin, and the number of $CH_2OH$, $—CH_2OCH_3$ and $—CH_2OCH_2OCH_3$ on the molecule is considerably smaller than 2. It is also not preferable that the desired formaldehyde conversion is attained for a longer time than 8 hours, because gel-like products are formed in the resin.

In the present process for preparing the aromatic hydrocarbon-formaldehyde resin, it is effective for lowering the viscosity and the specific gravity of the formed resins and consequently maintaining the interface between the aqueous layer and the oil layer and also very effective for controlling the reaction rate by stirring speed to add 5 to 50% by weight of an inert solvent having a boiling point range of 90° to 150° C. such as ethylbenzene, hexane, heptane, and octane, alone or in a combination, on the basis of the aromatic hydrocarbon, to the reaction system. Below 5% by weight of the inert solvent, no effect is obtained by the addition, whereas above 50% by weight gel-like products may be formed in the formed resin. In case of using an inert solvent having a boiling point of lower than 90° C., the refluxing temperature is lowered during the reaction and the reaction time is prolonged, whereas in case of using an inert solvent having a boiling point higher than 150° C., the inert solvent may remain in the formed resin after the reaction.

In separating the formed resin from the aqueous layer after the reaction, a diluting solvent is used to facilitate separation of the resin layer from the aqueous layer, but use of such an inert solvent can obviate the use of such a diluting solvent and thus can simplify the operating steps.

In the present invention, it is very important to control the formaldehyde conversion within the said specific range within the specific time, as described above, and furthermore, the molar ratio of the formaldehyde, aromatic hydrocarbon to the sulfuric acid concentration as a catalyst concentration, the reaction temperature, etc. are important factors for preparing the desired highly reactive aromatic hydrocarbon-formaldehyde resin of the present invention. The molar ratio of the formaldehyde to the aromatic hydrocarbon is in a range of 2.0 to 5.0, preferably 2.0 to 3.0. The sulfuric acid concentration is in a range of 15 to 35% by weight, preferably 20 to 30% by weight in the aqueous layer. The reaction temperature depends on whether the inert solvent is used or not, and is in a range of usually 80° to 110° C., preferably 95° to 105° C.

The aromatic hydrocarbon for use in the present invention includes, for example, toluene, xylene, mesitylene, durene, naphthalene, acenaphthylene, etc. The formaldehyde for use in the present invention is in the form of an aqueous solution which may contain a small amount of methanol as a stabilizer. It may also be, for example, commercially readily available formaldehyde-generating compounds such as formalin, paraformaldehyde, trioxane, etc.

As already described above, the present aromatic hydrocarbon-formaldehyde resin is highly reactive with compounds having active hydrogen atoms such as phenols, aliphalic unsaturated carboxylic acids, aromatic carboxylic acids, amines, etc., and a modified aromatic hydrocarbon resin obtained by reaction with the said compounds can give a cured resin having distinguished physical properties such as a high mechanical strength, a high heat resistance, etc.

For example, a shaped article obtained by curing a phenol-modified aromatic hydrocarbon resin, obtained by reaction of the present highly reactive aromatic hydrocarbon-formaldehyde resin with phenol, with hexamine has a glass transition temperature as high as 240° to 250° C. and a high strength retention ratio while hot, and can be used as a distinguished heat-resisting resin.

The phenols for use in modification of the present resin are monohydric or dihydric phenolic compounds having two or three functionalities, and include, for example, phenol, cresols, bisphenolpropane, bisphenolmethane, resorcinol, pyrocatechol, hydroquinone, p-tert-butylphenol, bisphenolsulfone, bisphenolether, paraphenylether, etc., among which phenol and its mixture with other phenols are most suitable for application to laminates, moldings, etc.

The amount of the phenols in moles (P) to be used herein is based on apparent moles of aromatic hydrocarbon-formaldehyde resin (F) obtained from the apparent molecular weight of aromatic hydrocarbon-formaldehyde resin calculated by doubling the xylenol equivalent weights, presuming the aromatic hydrocarbon-formaldehyde resin as formaldehyde component, and is so selected that a molar ratio of F/P can be 0.1 to 1.0, preferably 0.3 to 0.9. The xylenol equivalent weight is grams of the aromatic hydrocarbon formaldehyde resin capable of reaction with one mole of 2,6-xylenol.

The reaction of highly reactive aromatic hydrocarbon-formaldehyde resin with phenols is carried out in the presence or absence of a high boiling solvent while adding an acid as a catalyst or a Friedel-Crafts catalyst such stannic chloride, zinc chloride, ferric chloride, boron trifluoride etherate, etc. thereto. Preferable catalysts are acids which are mainly organic sulfonic acids including paratoluenesulfonic acid, xylenesulfonic acid, etc. The amount of the acid to be used depends on the reaction temperature and reaction time and cannot be specifically limited, but generally is 0.01 to 1.0% by weight on the basis of total charge. The reaction temperature depends on the species and amount of the catalyst, but generally in a range of 100° to 200° C. The reaction time is in a range of 1 to 5 hours.

After the reaction, formaldehyde can be added to the reaction product, if desired, to conduct reaction with the remaining phenols in the formed resins. The reaction is carried out in the presence of an acid catalyst such as hydrochloric acid, oxalic acid, etc. or in the presence of an alkali catalyst, usually at 100° C. to 150° C.

Examples of reaction of the present highly reactive aromatic hydrocarbon-formaldehyde resin with an aliphatic or aromatic carboxylic acid will be described below.

Reaction of the aromatic hydrocarbon-formaldehyde resin with an unsaturated polycarboxylic acid or its anhydride, and further with a saturated polycarboxylic acid or its anhydride, if desired, can be carried out according to a well known procedure by itself, but can be preferably carried out in the following manner.

A highly reactive, aromatic hydrocarbon-formaldehyde resin (a) is made to react with an unsaturated polycarboxylic acid or its anhydride (b) in the presence or absence of water, while introducing steam thereto, and then the reaction product is made to further react with a glycol (c) or both a glycol (c) and an unsaturated polycarboxylic acid or its anhydride. In this reaction, a ratio of the aromatic hydrocarbon-formaldehyde resin (a) to the unsaturated polycarboxylic acid or its anhydride (b) is not particularly limited, and their amounts can be selected appropriately, depending on what double bond proportion the modified aromatic hydrocarbon resin should have. In the first step reaction, that is, the reaction of the aromatic hydrocarbon-formaldehyde resin (a), for example, xylene-formaldehyde resin with the unsaturated polycarboxylic acid or its anhydride (b), for example, maleic anhydride, in the presence or absence of water while introducing steam, it is preferable to use 10 to 30 parts by weight of (b) on the basis of 100 parts by weight of (a). When the amount of (b) to be used throughout the reactions exceeds 30% parts by weight, the amount of (b) up to 30 parts by weight must be added in the first step reaction, and the remaining (b) must be added in the second step reaction, i.e. the reaction of the first step reaction product with the glycol (c), or both glycol (c) and an unsaturated polycarboxylic acid or its anhydride. Below 10% parts by weight of the unsaturated polycarboxylic acid or its anhydride, the reaction cannot be carried out satisfactorily, and the formaldehyde formed by the reaction cannot be removed satisfactorily by distillation.

When more than 30 parts by weight of (b) is added in the first step reaction, there is a danger of causing gellation during the reaction. The first step reaction is carried out at first at a temperature of at least 100° C., usually 110° to 120° C., and then at a temperature of about 200° C., usually at an elevated temperature of 180° to 220° C. while removing formaldehyde by introducing steam thereto. Then, the second step reaction of the reaction product from the first step reaction with the unsaturated polycarboxylic acid or its anhydride is carried out usually at a temperature ranged from 180° to 230° C.

The unsaturated polycarboxylic acid or its anhydride for use in the present invention includes, for example, maleic anhydride, maleic acid, fumaric acid, itaconic acid, etc., among which maleic anhydride is most preferable. If necessary, a saturated polycarboxylic acid or its anhydride or a glycol can be used together in the reaction. The saturated polycarboxylic acid or its anhydride includes, for example, adipic acid, sebacic acid, phthalic anhydride, phthalic acid, isophthalic acid, terephthalic acid, etc., and the glycol includes, for example, ethyleneglycol, propyleneglycol, diethyleneglycol, dipropyleneglycol, neopentylglycol, 1,3-butanediol, polypropyleneglycol, etc., which are used in preparing the ordinary unsaturated polyester resin.

The thus obtained modified aromatic hydrocarbon resin of the present invention is a kind of modified unsaturated polyester, and can be utilized as unsaturated polyester resins by mixing a polymerizable monomer therewith in the same manner as in case of the ordinary unsaturated polyester.

In the present invention, the content of diarylmethane, the xylenol value the number of —CH$_2$OH, —CH$_2$OCH$_3$ and —CH$_2$OCH$_2$OCH$_3$ on the molecule, and the molecular weight are determined in the following manner.

Diarylmethane: quantitatively determined by gas chromatography, using methyl benzoate as an internal standard substance.

Xylenol value: the aromatic hydrocarbon-formaldehyde resin is made to react with more than an equivalent weight of 2,6-xylenol in the presence of an acid catalyst, and the unreacted 2,6-xylenol is quantitatively determined by gas chromatography, using diphenylmethane as an internal standard substance. Xylenol value is obtained according to the following formula and expressed in moles of reacted 2,6-xylenol per kg of the aromatic hydrocarbon-formaldehyde resin.

$$\text{Xylenol value (mol/kg)} = \frac{(X_1 - X_2) \times 1,000}{m_1 \times W_1}$$

$m_1$ = molecular weight of 2,6-exylenol
$W_1$ = weight of aromatic hydrocarbon-formaldehyde resin (g)
$X_1$ = weight of charged 2,6-xylenol (g)
$X_2$ = weight of remaining 2,6-xylenol (g)

The nubmer of —CH$_2$OH, —CH$_2$OCH$_3$ and —CH$_2$OCH$_2$OCL$_3$: determined by $^1$H-NMR, using CDCL$_3$ as a solvent, and expressed in the number of —CH$_2$OH, —CH$_2$OCH$_3$ and —CH$_2$OCH$_2$OCH$_3$ on the molecule.

Molecular weight: determined by VPO (Vapor pressur osmometer), using methylethylketone as a solvent.

PREFERRED EMBODIMENTS OF THE INVENTION

Examples of the present invention will be described in detail below,

EXAMPLE 1

Into a separable flask having a capacity of 2 l, provided with a reflux condenser, a thermometer and an anchor-type stirrer having a full horizonal extension of 60 mm were charged 691 g (10.8 moles) of 47% by weight formalin, 237 g of 98% by weight sulfuric acid, and 572 g (5.4 moles) of metaxylene, in this order, and the mixture was subjected to reaction at a stirring speed of 200 rpm and 98° to 103° C. under reflux for 7 hours. The reaction was ended with the formaldehyde conversion of 70% by mole. Then, 458 g of meta-xylene as diluent was added to the product, and the mixture was stirred and settled to separate it into an oil layer and an aqueous layer. The oil layer, i.e. resin layer, was recovered, washed twice with warm water, and stripped at 130° C. under a reduced pressure of 30 mm Hg for one hour, whereby 700 g of light yellow viscous resin was obtained as resin A, whose analytical results are shown in Table 1.

EXAMPLE 2

Into the same reactor as used in Example 1 were charged 791 g (12.4 moles) of 47% by weight formalin, 271 g of 98% sulfuric acid, and 438 g (4.1 mole) of meta-xylene in this order, and the mixture was subjected to reaction at a stirring speed of 210 rpm and at 98° to 103° C. under reflux for 6 hours. The reaction was ended with the formaldehyde conversion of 65% by mole. Then, 350 g of metaxylene is diluent was added to the product, and the mixture was stirred and settled to separate it into an oil layer and an aqueous layer. The oil layer, i.e. resin layer, was recovered, washed twice with warm water and stripped at 130° C. under a reduced pressure of 30 mm Hg for one hour, whereby 450 g of light yellow, viscous resin was obtained as B, whose analytical results are shown in Table 1.

EXAMPLE 3

Into the same reactor as used in Example 1 were charged 739 g (11.5 moles) of 47% by weight formalin, 254 g of 98% by weight sulfuric acid, 408 g (3.9 moles) of metaxylene, and 100 g of n-octane in this order, and the mixture was subjected to reaction at a stirring speed of 200 rpm and a temperature of 98° to 102° C. under reflux for 6 hours. The reaction was ended with the formaldehyde conversion of 62% by mole. Then, the mixture was settled to separate it into an oil layer and an aqueous layer. The oil layer was recovered, washed twice with warm water and stripped at 130° C. under a reduced pressure of 30 mm Hg for one hour, whereby 430 g of light yellow, viscous resin was obtained as C, whose analytical results are shown in Table 1.

EXAMPLE 3

Into the same reactor as used in Example 1 were charged 853 g (13.4 moles) of 47% by weight formalin, 292 g of 98% by weight sulfuric acid, 284 g (2.7 moles) of meta-xylene and 71 g of n-heptane in this order, and the mixture was subjected to reaction at a stirring speed of 250 rpm and a temperature of 96° to 98° C. under reflux for 5 hours. The reaction was ended with the formaldehyde conversion of 53% by mole. Then, the mixture was settled to separate it into an oil layer and an aqueous layer. The oil layer was recovered, washed twice with warm water, and stripped at 130° C. under a reduced pressure of 30 mg Hg for one hour, whereby 370 g of light yellow, viscous resin was obtained as D, whose analytical results are shown in Table 1.

EXAMPLE 5

Into a glass-lined reactor having a capacity of 50 l, provided with a reflux condenser, a thermometer and an anchor-type stirrer having a full horizontal extension of 300 mm were charged 2,210 g (347.6 moles) of 47% by weight formalin, 7,580 g of 98% by weight sulfuric acid, 12,190 g (115 moles) of meta xylene and 3,020 g of n-heptane in this order, and the mixture was subjected to reaction at a stirring speed of 70 rpm and a temperature of 96° to 98° C. under reflux for 6 hours. The reaction was ended with the formaldehyde conversion of 66% by mole. Then, the mixture was cooled and settled to separate it into an oil layer and an aqueous layer. The oil layer was recovered, washed twice with warm water, and stripped at 130° C. under a reduced pressure of 30 mm Hg for one hour, whereby 12,800 g of light yellow, viscous resin was obtained as E, whose analytical results are given in Table 1.

COMPARATIVE EXAMPLE

Into the same reactor as used in Example 1 were charged 791 g (12.4 moles) of 47% weight formalin, 271 g of 98% by weight sulfuric acid, and 438 g (4.1 mole) of meta-xylene in this order, and the mixture was subjected to reaction at a stirring speed of 800 rpm and a temperature of 98° to 103° C. under reflux for 4 hours. The reaction was ended with the formaldehyde conversion of 85% by mole. The reaction mixture was treated thereafter in the same manner as in Example 1, whereby 744 g of light yellow, viscous resin was obtained as F, whose analytical results are shown in Table 1.

EXAMPLE 6

Into the same reactor as used in Example 1 were charged 750 g (11.8 moles) of 47% by weight formalin, 188 g of 98% by weight sulfuric acid, 467 g (3.9 moles) of mesitylene, and 100 g of n-octane in this order, and the mixture was subjected to reaction at a stirring speed of 200 rpm and at a temperature of 98° to 103° C. under reflux for 6 hours. The reaction was ended with the formaldehyde conversion of 65% by mole. Then, the mixture was settled to separate it into an oil layer and an aqueous layer. The oil layer was recovered, washed twice with warm water, and stripped at 130° C. under a reduced pressure of 30 mm Hg for one hour, whereby 490 g of light yellow, viscous resin was obtained as G, whose analytical results are shown in Table 1.

EXAMPLE 7

In the same reactor as used in Example 1 were charged 703 g (11.0 moles) of 47% by weight formalin, 240 g of 98% by weight sulfuric acid, 467 g (3.6 moles) of naphthalene, and 100 g of n-octane in this order, and the mixture was subjected to reaction at a stirring speed of 200 rpm and a temperature of 98° to 103° C. under reflux for 6 hours. The reaction was ended with the formaldehyde conversion of 63% by mole.

Then, the mixture was settled to separate it into an oil layer and an aqueous layer. The oil layer was recovered, washed twice with warm water and stripped at 130° C. under a reduced pressure of 30 mm Hg for one hour, whereby 480 g of light yellow, viscous resin was obtained as H, whose analytical results are shown in Table 1.

TABLE 1

| Item | Resin A | B | C | D | E | F | G | H |
|---|---|---|---|---|---|---|---|---|
| Dixylmethane | 2.5 | 2.0 | 1.5 | 0.7 | 1.5 | 11.0 | — | — |
| Dimesithyl methane | — | — | — | — | — | — | 0.4 | — |
| Dinaphthyl methane | — | — | — | — | — | — | — | 2.0 |
| Xylenol value mol/kg | 17.3 | 18.0 | 18.5 | 19.0 | 18.5 | 10.4 | 19.5 | 17.5 |
| Molecular weight | 480 | 500 | 470 | 430 | 390 | 550 | 400 | 530 |
| (*) | 2.0 | 2.0 | 1.95 | 2.0 | 2.0 | 1.0 | 2.0 | 2.0 |

(*) The number of —CH$_2$OH, —CH$_2$OCH$_3$ and —CH$_2$OCH$_2$OCH$_3$ on the molecule.

EXAMPLE 8

(phenol-modified aromatic hydrocarbon resin)

Into a separable flask having a capacity of 2, provided with a reflux condenser, a thermometer, and an anchor type stirrer having a full horizontal extension of 60 mm were charged 691 g (10.8 moles) of 47% by weight formalin, 237 g of 98% by weight sulfuric acid, and 572 g (5.4 moles) of meta-xylene, and the mixture was subjected to reaction at a stirring speed of 200 rpm and at a temperature of 98° to 103° C. under reflux for 7 hours, whereby the formaldehyde conversion of 70% by mole was obtained.

Then, 458 g of meta-xylene as diluent was added to the reaction mixture, and the mixture was stirred and settled to separate it into an oil layer and an aqueous layer. The oil layer was recovered, washed twice with warm water, and stripped at 130° C. under a reduced pressure of 30 mm Hg for one hour, whereby 700 g of light yellow, viscous resin was obtained. The resin has a dixylylmethane content of 2.5%, a xylenol value of 16.0 mol/kg, a molecular weight of 480 determined by the vapor pressure method, and an apparent molecular weight of 125.

Then, 600 g of the resin (4.80 moles on the assumption that the resin was formaldehyde having an apparent molecular weight of 125), and 564 g (6.0 mole) of phenol were charged into a separable flask having a capacity of 2, and uniformly mixed, and then admixed with 0.5 g of para-toluenesulphonic acid. The mixture was gradually heated and formed water started to distill off at about 90° C. with heat generation. The mixture was further heated while avoiding any sudden heat generation, and the end point was the maximum temperature of 150° C. at which no distillates came off. Unreacted phenol and volatile matters were removed therefrom by condensation under reduced pressure, whereby 980 g of light yellow modified resin was obtained, which was solid at the ordinary temperature and whose softening point was 96° C. as measured by the ring and ball method.

EXAMPLE 9

In the same separable flask as used in Example 8 were charged 460 g of the xylene-formaldehyde resin obtained in Example 8 (3.68 moles on the assumption that the resin was formaldehyde having an apparent molecular weight of 125), and 540 g (5.74 moles) of phenol, and 0.3 g of para-toluenesulphonic acid was added thereto as a catalyst. The mixture was heated while adjusting the state of heat generation and subjected to reaction at 100° to 130° C. for one to two hours, and cooled to 90° C. or lower when no formed water distilled off. Then, 100 g of xylene, 88 g (1.43 moles) of 47% formalin and 5 g of oxalic acid were added to the cooled mixture, and then the mixture was again heated and reacted under reflex for 2 hours. After the reaction, the mixture was concentrated under atmospheric pressure or reduced pressure. The end point was when the maximum temperature of 160° C. was reached, and 923 g of light brown, modified resin having a softening point of 98° C. was obtained.

EXAMPLE 10

Into the same separable flask as used in Example 8 were charged 460 g of the xylene-formaldehyde resin obtained in Example 8 (3.68 moles on the assumption that the resin was formaldehyde having an apparent molecular weight of 125), and 540 g (5.74 moles) of phenol, and then 1 g of BF$_3$.O(C$_2$H$_5$)$_5$ was added thereto as a catalyst. The mixture was subjected to reaction at 130° to 180° C. for one to two hours and cooled to 90° C. or lower when no formed water distilled off.

Then, 100 g of xylene, 88 g (1.43 moles) of 47% by weight formalin, and 5 g of oxalic acid were added to the cooled mixture, and the mixture was heated again and subjected to reaction in the refluxing state for 2 hours. After the reaction, the mixture was concentrated under atmospheric or reduced pressure. The end point was when the maximum temperature of 160° C. was reached, and 910 g of light brown solid modified resin having a softening point of 97° C. was obtained.

EXAMPLE 11

Each of the modified resins obtained in Examples 8, 9 and 10 was mixed with glass fibers, 13 μm in diameter and 3 mm long, hexamine, slaked lime, zinc stearate and a surface-treating agent in the following formulation and kneaded with heat rolls for a predetermined time. After pulverization, flexual test pieces were prepared therefrom by hot press molding. The thus obtained test pieces were subjected to post-curing in a hot air circulating drier. Heat-resisting strength of the test pieces is shown in Table 2, including a comparative example. The comparative example shows the heat-resisting strength of a test piece prepared from commacially available phenol-modified xylene-formaldehyde resin having a softening point of 96° C., obtained according to the conventional process, by molding and post-curing in the same manner as above.

Mixing formulation, molding conditions, and post-curing conditions are as follows:

Mixing formulation:

|   |   |
|---|---|
| The modified resin | 100 parts |
| Hexamine | 10 parts |
| Slaked lime | 2 parts |
| Glass fibers | 50 parts |
| Zinc stearate | 3 parts |
| Surface-treating agent | 0.3 parts |

Hot press molding conditions:
Temperature: 175° C.
Time: 1.5 minutes/1 mm thickness
Pressure: 200 kg/cm$^2$
Post-curing conditions:
140° C. for 6 hours
170° C. for 12 hours
220° C. for 6 hours
250° C. for 6 hours

EXAMPLE 12

(carboxylic acid-modified aromatic hydrocarbon resin)

Into a separable flask having a capacity of 2 l, provided with a reflux condenser, a thermometer and an anchor-type stirrer having a full horizontal extension of 60 mm were charged 691 g (10.8 moles) of 47% by weight formalin, 237 g of 97% by weight sulfuric acid, and 572 g (5.4 moles) of meta-xylene in this order, and the mixture was subjected to reaction at a stirring speed of 200 rpm and a temperature of 98° to 103° C. under reflux for 7 hours with the formaldehyde conversion of 70% by mole.

Then, 458 g of meta-xylene as diluent was added thereto, and the mixture was stirred and settled to separate it into an oil layer and the aqueous layer. The oil layer was recovered, washed twice with warm water, and stripped at 130° C. under a reduced pressure of 30 mm Hg for one hour, whereby 700 g of light yellow, viscous resin was obtained. The resin had a dixylylmethane content of 2.5% by weight, a xylenol value of 16.0 mol/kg, a molecular weight of 480, as determined by the vapor pressure osmometer, and an apparent molecular weight of 306. The apparent molecular weight herein referred to was obtained by doubling the equivalent weight of benzoic acid calculated on the assumption that the xylene formaldehyde resin is a glycol component. The equivalent weight of benzoic acid is grams of the aromatic hydrocarbon-formaldehyde resin capable of reacting with one mole of benzoic acid.

Then, 2,114.5 g of the thus obtained xylene-formaldehyde resin (6.91 mole on the assumption that the resin was a glycol having an apparent molecular weight of 306), 521.4 g (5.31 mole) of maleic anhydride, and 95.7 g (5.31 mole) of water were charged into a reactor having a capacity of 3 l, provided with a stirrer, a thermometer, a reflux condenser and a fractionator, and the mixture was heated to 120° C. and subjected to reaction under reflux with stirring for 15 minutes. Then, steam was blown into the reaction system at a rate of about 200 g/hr and the mixture was heated to 190° C. over 2 hours while distilling off the formed formaldehyde as an aqueous solution, and further subjected to reaction at 190° C. for one hour.

After the reaction, the blowing of steam was discontinued, and 364.1 g (4.78 moles) of propyleneglycol was added thereto, while introducing a nitrogen gas thereto at a rate of 300 ml/minute. Then, the mixture was

TABLE 2

Glass transition temperature and heat-resisting strength of moldings

|   |   | Resin | | | |
|---|---|---|---|---|---|
|   |   | Resin of Ex. 8 | Resin of Ex. 9 | Resin of Ex. 10 | Commercially available resin (Comp. Ex.) |
| Glass transition temperature | °C. | 240 | 250 | 245 | 210 |
| Flexural strength at 20° C. | Kg/mm$^2$ | 9.5 | 10.2 | 10.5 | 9.6 |
| Flexural strength at 250° C. | Kg/mm$^2$ | 7.2 (75.9%) | 8.9 (87.1%) | 8.9 (85.1%) | 3.9 (41.0%) |
| Flexural strength after heating at 250° C. for 500 hours, as measured at 20° C. | Kg/mm$^2$ | 8.0 (84.5%) | 9.2 (90.3%) | 10.0 (95.1%) | 6.7 (70.0%) |

Glass transition temperature: determined by changes in the thermal expansion coefficient.
Flexural strength: determined according to JIS K 6911.
Numerical values in % in parentheses mean retention ratios to the flexural strength at 20° C.

heated to 210° C. and subjected to reaction at 210° C. in a nitrogen gas stream for 2.5 hours and then, after removal of low boiling components under reduced pressure for 15 minutes, subjected to further reaction for 45 minutes, whereby 2,355 g of modified resin having an acid number of 12.4 mg KOH/g was obtained.

The thus obtained modified resin was dissolved, together with 0.21 g of toluhydroquinone, into 1,640 g of styrene, whereby a liquid resin having a viscosity of 747 centipoises (25° C.) was prepared (resin I).

EXAMPLE 13 (COMPARATIVE EXAMPLE)

Into the same flask as used in Example 12 were charged 3,609 g of commercially available xylene-formaldehyde resin Nikanol H (trade mark of a product made by Mitsubishi Gas-Chemical Co., Inc., Japan) having a dixylylmethane content of 10.5% by weight, a xylenol value of 10.4 mol/kg, a molecular weight of 490, as measured by the vapor pressure osmometer, and an apparent molecular weight of 415 (8.70 mole on the assumption that the resin was a glycol having an apparent molecular weight of 415), 858 g (8.75 moles) of maleic anhydride, and 158 g (8.75 moles) of water in this order, and the mixture was heated to 120° C., and subjected to reaction under reflux with stirring for 15 minutes, and then heated to 190° C. over 2 hours while distilling off the formed formaldehyde as an aqueous solution by blowing steam into the reaction system at a rate of about 200 g/hr, and subjected to further reaction at 190° C. for one hours.

After the reaction, the blowing of steam was discontinued, and 451 g (5.93 moles) of propyleneglycol was added thereto while introducing a nitrogen gas thereto at a rate of 300 ml/min. and then the mixture was heated to 210° C.

Then, the mixture was subjected to reaction at 210° C. in a nitrogen gas stream for 5.5 hours, and, after removal of low boiling components therefrom under reduced pressure for 15 minutes, subjected to further reaction for 1.25 hours, whereby 4,180 g of modified resin having an acid number of 12 mg KOH/g was obtained.

The thus obtained modified resin was dissolved, together with 0.3 g of toluhydroquinone, into 2,787 g of styrene, whereby a liquid resin having a viscosity of centipoises (25° C.) was prepared (resin J).

The physical properties of the cured resins (castings) from resin I and J were investigated according to the following procedure.

Procedure for preparing casting sheet

To 100 parts of each of the liquid resins were added 0.5 parts of a 6% cobalt naphthenate solution, 0.1 part of dimethylanilin, and 1.0 part of 50% methylethylketone peroxide, and the mixtures were each cured to make the casting sheets having a thickness of 3 mm. Post-curing condition was 20° C. for 16 hours and 100° C. for 2 hours.

Preparation of test pieces and measurement of physical properties were made according to JIS K-6919. The results are shown in Table 3.

TABLE 3

| Physical properties of casting sheet each of resins | | |
|---|---|---|
| | Resin I | Resin J |
| Double bond equivalent | 460 | 480 |
| Barcol-hardness (#934-1) | 43 | 36 |
| Heat distortion temperature (°C.) | 80 | 73 |
| Tensile strength (MPa) | 66.6 | 56.7 |

TABLE 3-continued

| Physical properties of casting sheet each of resins | | |
|---|---|---|
| | Resin I | Resin J |
| Tensile modulus (GPa) | 3.52 | 3.67 |
| Tensile elongation (%) | 2.3 | 1.7 |
| Flexural strength (MPa) | 91.3 | 83.9 |
| Flexual modulus (GPa) | 3.90 | 3.48 |

What is claimed is:

1. A highly reactive aromatic hydrocarbon-formaldehyde resin having a diarylmethane content of not more than 5% by weight, having reactive groups selected from the group consisting of —CH$_2$OH, —CH$_2$OCH$_3$, and —CH$_2$OCH$_2$OCH$_3$ at both molecular terminals, and having a xylenol value of at least 16 mols/kg as an index of reactivity with a compound having active hydrogen atoms, which resin is prepared by the process comprising reacting an aromatic hydrocarbon with formaldehyde at a molar ratio of the formaldehyde to aromatic hydrocarbon of 2.0 to 5.0, in the presence of an aqueous solution containing 15 to 35% by weight sulfuric acid and at a reaction temperature of 80° C. to 110° C., while controlling a formaldehyde conversion within a range of 50 to 70% by mole over a period of 4 to 8 hours.

2. A highly reactive aromatic hydrocarbon-formaldehyde resin according to claim 1, wherein the aromatic hydrocarbon-formaldehyde resin is selected from the group consisting of xylene-formaldehyde resin and mesitylene-formaldehyde resin.

3. A highly reactive aromatic hydrocarbon-formaldehyde resin according to claim 1, wherein the reaction is carried out while maintaining an interface between an oil layer and an aqueous layer.

4. A highly reactive aromatic hydrocarbon-formaldehyde resin according to claim 1, wherein the reaction is carried out while maintaining an interface between an oil layer and an aqueous layer in the presence of an aliphatic hydrocarbon solvent inert to the reaction and having a boiling point of 95° C. to 150° C.

5. A highly reactive aromatic hydrocarbon-formaldehyde resin according to claim 4, wherein 5 to 50% by weight of the aliphatic hydrocarbon solvent inert to the reaction is used, based on the weight of the aromatic hydrocarbon.

6. A highly reactive aromatic hydrocarbon-formaldehyde resin according to claim 4, wherein the aliphatic hydrocarbon solvent inert to the reaction is selected from the group consisting of hexane, heptane and octane.

7. A highly reactive aromatic hydrocarbon-formaldehyde resin according to any one of claims 1, 2, 3, 4, 5 or 6, wherein the aromatic hydrocarbon is selected from the group consisting of xylene, mesitylene and naphthalene.

8. A process for preparing a phenol-modified aromatic hydrocarbon-formaldehyde resin by reacting an aromatic hydrocarbon-formaldehyde resin with phenols, which comprises reacting the highly reactive aromatic hydrocarbon-formaldehyde resin defined in claim 1 with phenols.

9. A process for preparing a carboxylic acid-modified aromatic hydrocarbon-formaldehyde resin by reacting an aromatic hydrocarbon-formaldehyde resin with a polycarboxylic acid or an anhydride thereof which comprises reacting the highly reactive aromatic hydrocarbon-formaldehyde resin defined in claim 1 with a polycarboxylic acid or an anhydride thereof.

10. A process according to claim 9, wherein the reaction of a aromatic hydrocarbon-formaldehyde resin with an unsaturated polycarboxylic acid or an anhydride thereof is carried out in the presence or absence of liquid water, while introducing steam to the reaction system.

11. A phenol-modified aromatic hydrocarbon-formaldehyde resin prepared by the process according to claim 8.

12. A carboxylic acid-modified aromatic hydrocarbon-formaldehyde resin prepared by the process according to claim 9.

* * * * *